Jan. 30, 1923.
R. BLACK.
LOADER.
FILED JAN. 3, 1920.
1,443,557
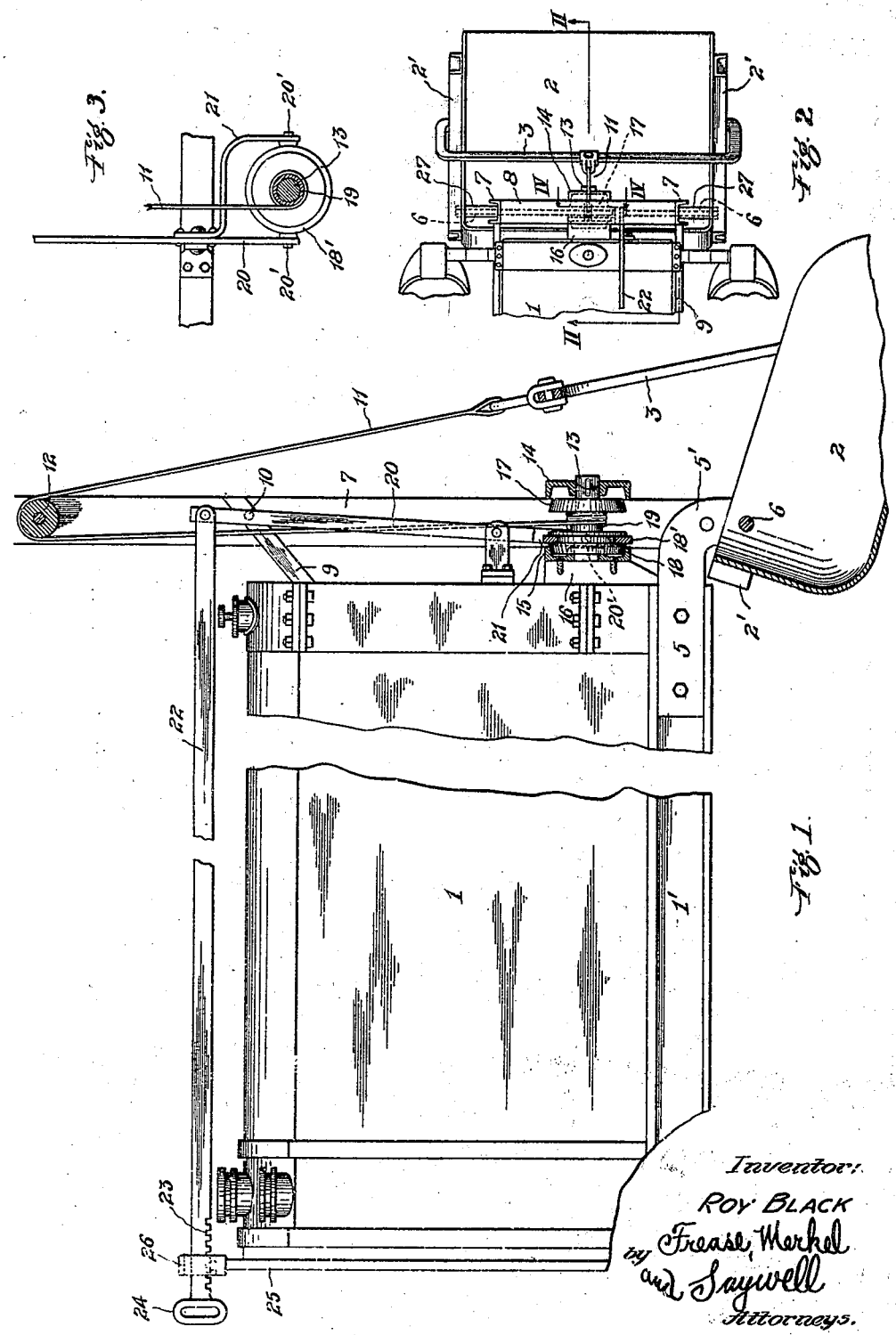
Inventor:
ROY BLACK
by Frease, Merkel
and Saywell
Attorneys.

Patented Jan. 30, 1923.

1,443,557

UNITED STATES PATENT OFFICE.

ROY BLACK, OF CLEVELAND, OHIO.

LOADER.

Application filed January 3, 1920. Serial No. 349,228.

*To all whom it may concern:*

Be it known that I, ROY BLACK, a citizen of the United States, resident of Cleveland, county of Cuyahoga, and State of Ohio, have invented new and useful Improvements in Loaders, of which the following is a specification, the principle of the invention being herein explained and the best mode in which I have contemplated applying that principle, so as to distinguish it from other inventions.

My invention relates to loaders, and particularly to devices of this character adapted to be used with a self-propelled vehicle such as a tractor.

The annexed drawings and the following description set forth in detail certain means embodying my invention, the disclosed means, however, constituting but one of the various mechanical forms in which the principle of the invention may be employed.

In said annexed drawings:

Fig. 1 represents a side elevation partly in section.

Figure 2 represents a plan view of my improved loading mechanism and fragmentary portions of the front end of the tractor to which the same is connected; and Figure 3 represents a transverse vertical section, taken on the plane indicated by the line IV—IV, Figure 2.

In said annexed drawings, a standard tractor design is indicated by the ordinal 1, having the longitudinal side channels 1'. My invention contemplates the pivoting of a scoop 2 to the front end of said tractor 1 so that the scoop may be forced into dirt, gravel or other material which it is desired to load or to move from one position to the other. The scoop 2 is provided with a bail 3 and is formed with longitudinal strengthening channels 2' disposed adjacently its upper edge.

The scoop 2 is connected to the tractor 1 by means of bars 5 secured to the front ends of the channels 1' and having forward downwardly members 5' riveted to a pair of upwardly extending channels 7. A rod 6 extends through both members 5' and the channels 7 and upon this rod the scoop is pivoted.

The upwardly extending channels 7 are spaced from the scoop channels 2' and two sections of pipe 27 surrounding the rod 6 are utilized as seperators and strengthening members between the channels 2' and 7.

The upper ends of the channels 7 are spaced and strengthened by the transversely extending member 8. The channels 7 are further braced by means of the arms 9 connected at their lower ends intermediately of the ends of the channels 1' and at their upper ends to the channels 7 at the points 10 intermediately of the upper and lower ends of the latter.

I provide means for raising and lowering the scoop 2 or for holding the same at any desired elevated position. To this end a cable 11 is secured to one end of the bail 3 and passes over a roller 12 mounted adjacently to the upper ends of the channels 7 and between said channels, as plainly shown in Figure 1. The crank-shaft of the tractor is indicated by the ordinal 13 and a clutch member 14 is secured thereto. A second clutch member 15 is fixedly secured to a frame member 16 of the tractor and in axial line with the clutch member 14. Two movable clutch members 17 and 18 adapted to cooperate respectively with the clutch members 14 and 15 are formed integral with or secured to a drum or shell 19 loosely mounted upon the crank-shaft 13. The clutch member 18 is formed with a collar 18' disposed intermediately the ends of its beveled face, as plainly shown in Figures 1 and 3. The other end of the cable 11 is secured to the drum 19 and the cable is adapted to be wound upon said drum intermediately of the clutch members 17 and 18, the collar 18' preventing the adjacent section of the cable 11 from interfering with the action of the clutch members 15 and 18. In order to actuate the movable clutch members 17 and 18, I provide an upwardly extending bar 20 pivoted adjacent its lower end to the front of the tractor 1 and pivotally secured at its upper end to a longitudinally extending bar 22. This bar 20 is secured by means of a pin 20' to one side face of the collar portion 18' of the clutch element 18 and is also secured by means of an angular extension 21 to the diametrically opposite face of said collar member 18'. The bar 22 is formed adjacent its rear end and upon its bottom face with a series of notches 23, and a grip 24. An upwardly extending bar 25 secured to the rear of the tractor 1 is formed with a slotted head member 26 having a tooth portion co-operating with the notches 23 so as to lock the arm 22 in any desired longitudinal position, within the range allowed by the notches 23. It is evident that if the crank-shaft 13 is rotated counter-clockwise, a backward pull upon the grip 24 will throw the clutch element 17 into engagement with the clutch element 14 and result in the lifting of the scoop 2. It is also evident that if the bar 22 is forced forwardly, this action will result in the engagement of the clutch element 18 with the clutch element 15, resulting in a holding of the scoop 2 in a desired elevated position. When both pairs of the co-operating clutch members are released, the scoop 2 will fall by gravity.

As an illustration of the working of my improved loader, we will assume that the tractor 1 is driven up to a pile of gravel with the scoop 2 elevated to clear the surface of the ground. When the gravel pile is reached, the scoop 2 is lowered or elevated, as is necessary to properly dig into the pile, and the tractor driven forward so that the scoop penetrates the pile and is properly filled. Then the clutch elements 14 and 17 are brought into engagement and the scoop 2 elevated somewhat higher than the position necessary to clear the ground and to hold its contents. Then the clutch elements 15 and 18 are brought into engagement, any slight dropping of the scoop 2 during the time of passage of the clutch elements through neutral position being compensated for by the fact that the scoop 2 had been elevated somewhat above the required position. The tractor is then backed off and run up onto the dumping or loading platform, whichever disposition it is desired to make of the scoop contents, and the clutch elements 15 and 18 released so as to allow the scoop to fall by gravity, when the contents will run out by gravity or can be easily pushed or pulled out by suitable tools. The scoop is then again elevated an amount necessary to clear the surface of the ground, fixed in this position and the tractor driven up adjacently to the gravel pile.

What I claim is:

1. A tractor loader of the character described comprising a crank-shaft, a clutch element fixedly secured to the crank-shaft beyond the front of the tractor, a second clutch element fixed to the upright front end of the tractor, a sleeve mounted upon said crank-shaft intermediate said clutch elements and formed with a pair of co-operating clutch elements, and means for moving said sleeve so as to engage or release the clutch elements.

2. A tractor loader of the character described comprising a crank-shaft, a clutch element fixedly secured to the crank-shaft beyond the front of the tractor, a second clutch element fixed to the upright front end of the tractor, a sleeve loosely mounted upon said crank-shaft, and formed with a pair of co-operating clutch elements, one of said clutch elements being formed with a collar disposed intermediately the ends of its beveled face, said collar extending beyond the periphery of said clutch members, and means for moving said sleeve so as to engage or release the clutch elements.

Signed by me, this 29th day of December, 1919.

ROY BLACK.